United States Patent [19]
Donaldson et al.

[11] Patent Number: 5,738,070
[45] Date of Patent: Apr. 14, 1998

[54] METHOD AND APPARATUS FOR OPERATION OF A SPEED-GOVERNED LEAN BURN ENGINE TO IMPROVE LOAD RESPONSE

[75] Inventors: George E. Donaldson; William H. Lane, both of Chillicothe, Ill.

[73] Assignee: Caterpillar Inc., Peoria, Ill.

[21] Appl. No.: 766,550

[22] Filed: Dec. 11, 1996

[51] Int. Cl.⁶ .................................................. F02D 41/14
[52] U.S. Cl. .................................................... 123/352
[58] Field of Search .......................... 123/344, 352, 123/361, 527

[56] References Cited

U.S. PATENT DOCUMENTS

| | | | |
|---|---|---|---|
| 4,040,394 | 8/1977 | Wahl et al. | 123/680 |
| 4,112,885 | 9/1978 | Iwata et al. | 123/361 |
| 4,368,705 | 1/1983 | Stevenson et al. | 123/416 |
| 4,411,236 | 10/1983 | Matsui et al. | 123/492 |
| 4,416,237 | 11/1983 | Aoki et al. | 123/438 |
| 4,434,768 | 3/1984 | Ninomiya | 123/436 |
| 4,445,483 | 5/1984 | Hasegawa | 123/492 |
| 4,466,410 | 8/1984 | Sakakibara et al. | 123/675 |
| 4,470,395 | 9/1984 | Ohgami et al. | 123/682 |
| 4,481,929 | 11/1984 | Hasegawa | 123/494 |
| 4,501,243 | 2/1985 | Niimi et al. | 123/680 |
| 4,617,900 | 10/1986 | Kobayashi et al. | 123/684 |
| 4,628,883 | 12/1986 | Kataoka | 123/682 |
| 4,867,127 | 9/1989 | Quirchmayr et al. | 123/527 |
| 5,311,849 | 5/1994 | Lambert et al. | 123/361 |

OTHER PUBLICATIONS

Caterpillar product brochure LEHT5626 (Oct. 1995), for Gas Truck Engine G3306.

*Primary Examiner*—Andrew M. Dolinar
*Attorney, Agent, or Firm*—Gordon H. Telfer

[57] ABSTRACT

A speed-governed lean burn engine and its fuel and air delivery apparatus are provided with a control system that monitors engine conditions, including actual speed relative to a desired speed setting, to determine which of two air to fuel ratios the engine operates with under the existing conditions: either a stoichiometric ratio or a lean-burn ratio. A stoichiometric ratio is to provide short periods of smooth and rapid response to an increased load during which NOx emissions are reduced by a three-way catalyst in the exhaust from the engine. The lean-burn ratio during other periods of operation is sufficiently lean to exhibit low NOx emissions and allows operation with low fuel consumption. The invention can be applied to improve performance of gas fueled truck engines, for example.

7 Claims, 2 Drawing Sheets

METHOD AND APPARATUS FOR OPERATION OF A SPEED-GOVERNED LEAN BURN ENGINE TO IMPROVE LOAD RESPONSE

TECHNICAL FIELD

This invention relates to internal combustion engines and fuel systems therefor with a method and apparatus for controlling so that desired performance characteristics are met with low NOx emissions and low fuel consumption.

BACKGROUND ART

Engines and their fuel control systems are designed according to a number of different criteria. Operator convenience, fuel cost, fuel consumption, and emissions are factors taken into account in addition to performance in delivering power to a load. For example, there is interest in using fuels other than gasoline or conventional diesel fuel. One fuel of interest is natural gas because of existing or potential cost, availability, and emissions advantages. For example, natural gas engines have been used in heavy-duty trucks. Truck engines for use on public roads have to satisfy emissions regulations. Caterpillar engines designated G3306 use either compressed natural gas or propane and successfully meet emissions requirements and also provide economical fuel consumption.

Two approaches have been considered to achieve low emissions with a natural gas fuel engine. The prior gas engines, referred to above, satisfy requirements for low nitric oxide (NOx), low hydrocarbon (HC), and carbon monoxide (CO) emissions by a three-way catalytic converter.

Operation of an engine with a three-way catalyst effective against NOx as well as CO and HC emissions yields the optimum overall efficiency at a stoichiometric air to fuel ratio, also referred to as a λ=1 where λ is expressed as the ratio of an actual air to fuel ratio to the stoichiometric air to fuel ratio. While λ is not maintained at a precise value, it is the case, due to storage effects exhibited by three-way catalytic converters, that the NOx emissions are low in operating at or near a stoichiometric ratio that allows some small variations. Stoichiometric engines are characterized by having good load response but do not provide optimum fuel economy. Load response refers to the time required for the engine to adapt to a variation in load.

A second approach to NOx reduction is to operate the engine at lean air to fuel ratios of about 1.5 or more (hereafter referred to as Lean Burn) where the engine combustion process naturally yields low NOx emissions. These engines are characterized by having optimum fuel economy but have slower load response than a stoichiometric engine and that has hindered their use.

It has been common to build engine systems for either of two modes of operation regarding the relation of engine load and engine speed. Automobiles and some trucks operate in a mode called load-governed. At a given accelerator setting, the speed will vary over a wide range depending on load. For example, the engine speed, and therefore the vehicle speed, will vary considerably in climbing a hill compared to the speed on a level surface. In order to adapt to a change in load, it is necessary to change the accelerator pedal position.

Some vehicles, particularly some heavy duty trucks as well as off-road construction vehicles, operate in a speed-governed mode. In that mode, a given accelerator setting determines the speed regardless of the load, at least over a wide range of loads. The operator is freed from having to adjust the accelerator for terrain variations or variations in cargo, such as in order to avoid stalling. Speed-governed engine systems require different control strategies than do load-governed engine systems.

Recent engine systems typically have control units that have electronic signal processing capability. Such a control unit is sometimes referred to as an Electronic Control Unit (ECU) or an Electronic Control Module (ECM) and includes a microprocessor that is programmed variously to respond to a set of conditions to adjust some operating device such as a fuel regulator or air inlet throttle. The response set by the programmed microprocessor is generally in accordance with a predetermined timing map. By way of general background, U.S. Pat. No. 4,368,705, Jan. 18, 1983, by Stevenson et al. is herein incorporated by reference for examples of electronic control in engine systems.

DISCLOSURE OF THE INVENTION

The invention, addresses the circumstances referred to above and provides emission control and engine air to fuel ratio technology in an innovative way so that a gas engine may have response and other characteristics more closely equivalent to conventionally fueled diesel engines, even though operated at a lean burn ratio a substantial part of total operation. The invention is particularly applicable to speed-governed engine systems so it can be applied to a wide range of heavy duty equipment and vehicles that perform considerable off-road service but have road service as well and therefore must meet emissions regulations.

The engines to which the invention is applicable are provided with three-way catalysts in their exhaust systems so NOx emissions at or near a stoichiometric air to fuel ratio are minimized.

In one form, the invention includes a method and apparatus for operating the engine using a control strategy that monitors the actual engine speed and compares it to a speed that has been set as a desired speed (e.g., in accordance with the setting of an accelerator). Other engine operating parameters, in addition to speed, may also be monitored. They may include parameters such as manifold temperature and pressure. A speed difference signal, between actual and desired speeds, of at least a predetermined magnitude is processed, possibly along with other signals, in a control unit to provide signals for adjusting fuel flow and air flow.

The control unit is arranged to provide air and fuel adjustment signals so the speed is maintained within predetermined limits from the set or desired speed. That is, the fuel rate is changed and/or the air to fuel ratio is changed. However, the control unit has further conditions imposed on it, namely that the air to fuel ratio is either lean burn, such as about 1.5 or greater, or is near stoichiometric, i.e., approximately one, with transitions between those ratios occurring quickly to minimize the occurrence of NOx emissions in the range of λ from about 1 to about 1.5 which would otherwise occur.

The invention can achieve better fuel economy and lower heat rejection compared to otherwise similar engines (with a three way catalyst) operated consistently at stoichiometric mixtures. It also can achieve reduced NOx emissions compared to lean burn engines without three way catalysts. Furthermore, it is significant that advantages of lean burn operation can be realized over a significant part of total operation while also having the additional capability, even with natural gas, of rapidly transitioning to a stoichiometric ratio and improving the speed of response to increased load so it more closely matches that of conventionally fueled diesel engines. Consequently, a natural gas engine can be operated without the previously encountered compromise between performance, fuel consumption and emissions.

While having beneficial application to engine systems as described in the background, above, in which natural gas is the fuel and the engine has spark ignition, it will be recognized that the invention may be applied to engine systems using other fuels. In addition, while the invention may be described principally with regard to engine systems utilizing substantially homogeneous mixtures of air and fuel supplied to engine combustion chambers, it may be adapted for use in engine systems using a direct injected fuel, such as natural gas, where air and fuel mixing occurs in the combustion chamber.

The foregoing and additional aspects of the invention will be better understood by reference to the following description along with the accompanying drawing.

BEST MODE FOR CARRYING OUT THE INVENTION

Figure 1:
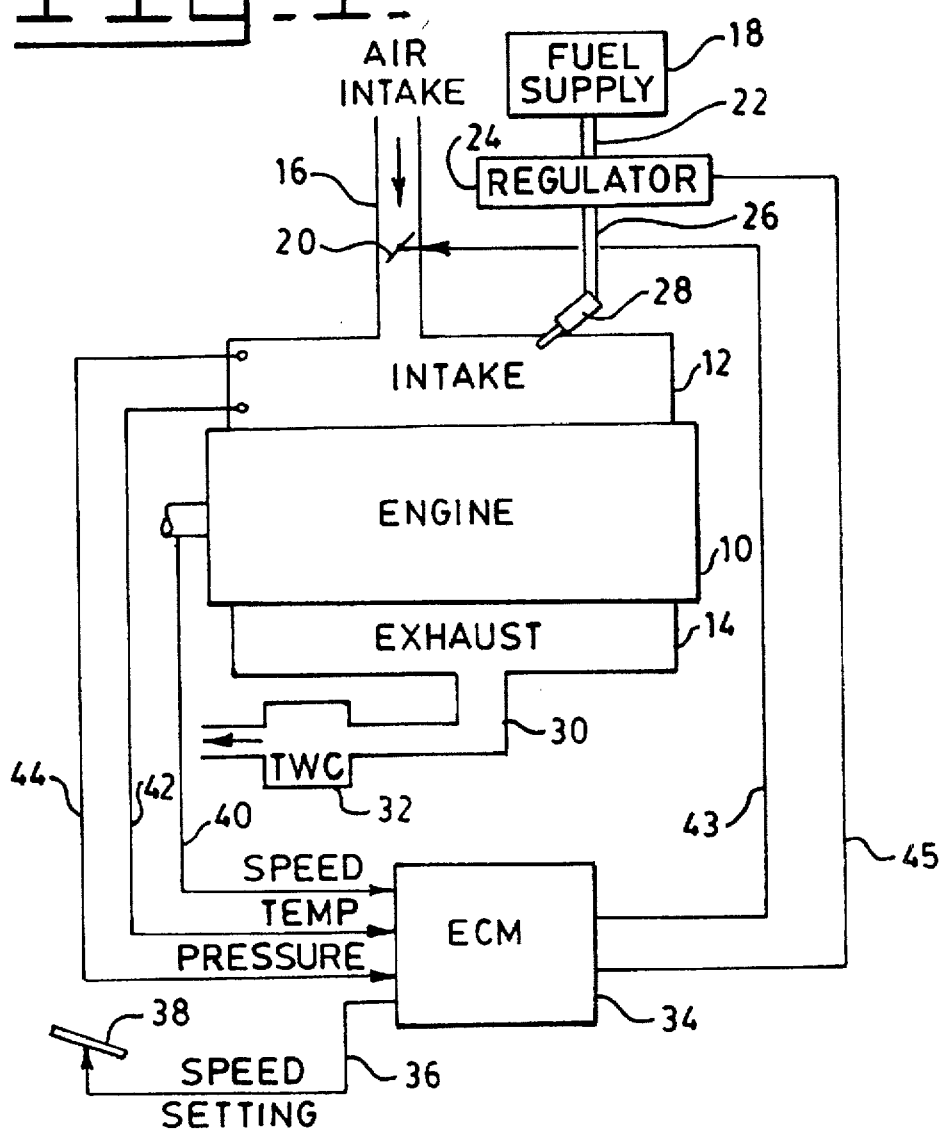
FIG. 1 is a schematic diagram of an engine system in accordance with an embodiment of the invention.

Referring to FIG. 1, there is shown a speed-governed engine in combination with a low NOx fuel system comprising an engine 10 that has an intake manifold 12 and an exhaust manifold 14. The engine 10 may comprise a plurality of cylinders each providing a respective combustion chamber (not shown). It will be understood that the intake and exhaust manifolds 12 and 14 are each in fluid communication with the cylinders.

The intake manifold 12 is also in fluid communication with an air intake 16 and with a fuel supply 18. The air intake 16 has an adjustable throttle 20. The fuel supply 18 is, for example, a supply of a gaseous fuel such as natural gas or propane. It communicates through a conduit 22 with a fuel regulator 24 which in turn communicates through a conduit 26 and an injector 28 with manifold 12. Air delivered to the manifold 12 through intake 16 and fuel delivered to the manifold through injector 28 are, in this example, mixed in the manifold 12 prior to entry into the cylinders of engine 10 where the fuel is combusted either with spark ignition or a diesel combustion. After combustion in the respective cylinders, gaseous products of combustion and any waste exit into the exhaust manifold 14.

The exhaust manifold 12 communicates through a conduit 30 with a catalytic converter 32 containing a three way catalyst (TWC) from which exhaust gases pass into the atmosphere.

The engine 10, with manifolds 12 and 14, the fuel and air delivery apparatus comprising fuel supply 18 and related elements and air intake conduit 16 and related elements, and the catalytic converter 32 may be of known designs. The engine system may be turbocharged with a compressor in the air inlet 16 driven by a turbine in the exhaust conduit 30

The engine system includes and is under the control of an electronic control module (ECM) 34 which receives as one of its inputs a speed setting signal, on line 36, from a speed setting device 38 which may be an accelerator pedal the position of which is set by the foot of an operator of a vehicle driven by the engine system. That is, the position of device 38 fixes the set speed at which the engine is intended to be driven, regardless of engine load. Therefore, the engine 10 is operated as a speed-governed engine rather than as a load-governed engine.

The EMC 34 contains a microprocessor that in accordance with know practice can perform electronic signal processing involving logic and programmed computations. In addition to receiving an input signal representing the speed setting on line 36, there is an input signal to the ECM on line 40 representing the present actual speed of the engine. Various other engine parameters may be monitored as well including, in this example, the temperature and pressure of the intake manifold 12 with respective inputs to the ECM representing those conditions supplied on lines 42 and 44. Additional parameters that could be monitored include one or more of the actual setting of the air intake throttle 20, the mass flow of air through air intake 16 and throttle 20, the actual setting of the fuel regulator 24 and the actual rate of fuel transferred through the regulator 24, conduit 26 and injector 28. A variety of known types of sensors may be used at various locations to monitor the parameters of interest in a specific application and to provide electrical signals corresponding to them.

The ECM 34 processes the input signals representing the monitored parameters to determine whether a speed difference exists between the desired, or set, speed and the actual speed. Normally, any speed difference (or "speed error") detected would have to be at least some predetermined magnitude before a corrective adjustment would be initiated. For the speed-governed engines of principal interest, that predetermined difference magnitude would be small.

If the actual speed is sufficiently different than the desired speed set by the pedal 38, corrective adjustments of either or both of the throttle 20 and regulator 24 are made by respective output signals from the ECM on lines 43 and 45. In addition to the speed error, the ECM may optionally process other signals as above mentioned in order to determine the correct amount of adjustment to meet both of two criteria: (1) to eliminate the speed error and (2) to run the engine at either a stoichiometric air to fuel ratio or at a predetermined lean burn air to fuel ratio. The criteria mentioned may have some tolerance but still the system is to substantially only operate as stated in order to achieve low NOx emissions continuously, good speed control with, as a result of phases of operation at a stoichiometric ratio, smooth and rapid response to changing loads.

The ECM 34 may be of the same general character as previously used engine control units having a microprocessor that can be programmed for performing control functions that satisfy predetermined conditions. Above mentioned U.S. Pat. No. 4,368,705 describes examples of such control units and their use.

Figure 2:
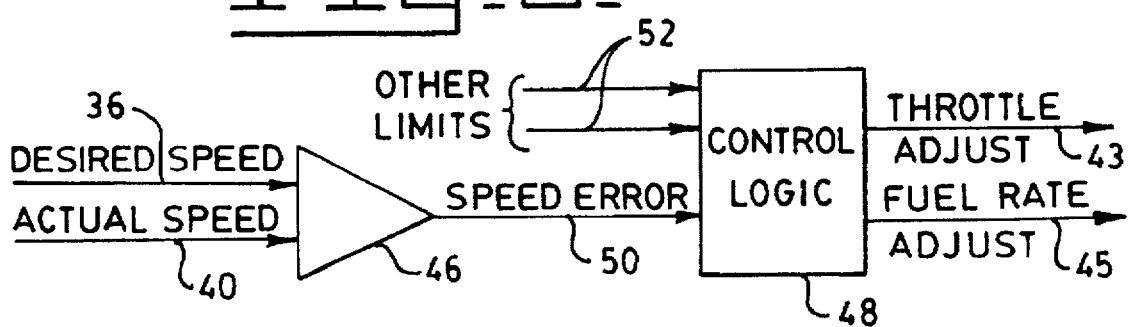
FIG. 2 is a schematic diagram illustrating a control strategy in accordance with the invention.
Figure 3:
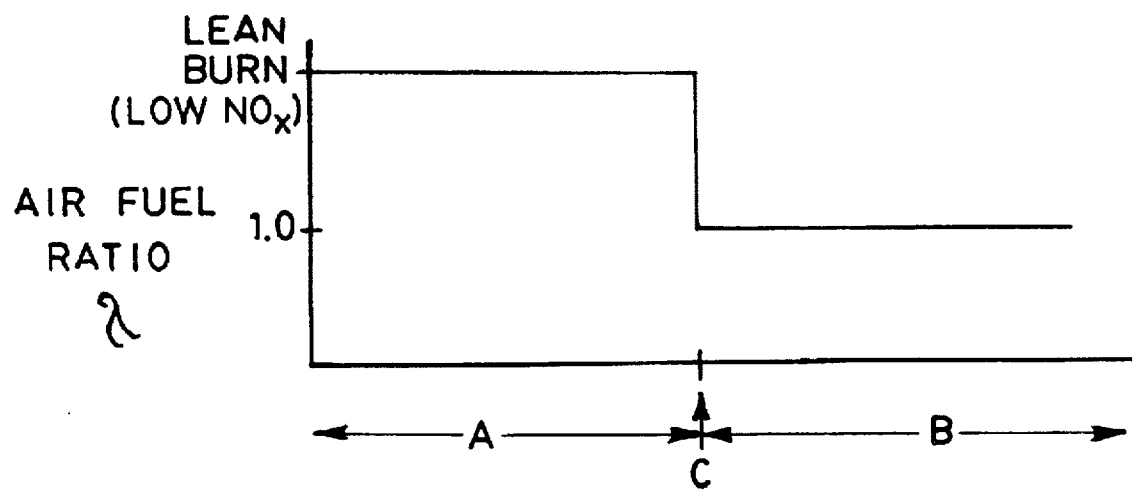
FIGS. 3 and 4 are charts showing the effect of control strategies in accordance with the invention.

FIGS. 2 and 3 further illustrate the control strategy practiced in accordance with the invention. In FIG. 2, a comparator 46 and a control logic circuit 48 which may be parts of the ECM 34 are shown. Comparator 46 receives speed signal inputs on lines 36 and 40 and produces a speed error signal on line 50. In some applications, such a speed error signal may be all that is necessary for control logic 48, operating in accordance with a programmed microprocessor, to calculate and, as needed, generate adjust signals on lines 43 and 45. Preferably, other parameters such as were mentioned above, are taken into account. Hence, FIG. 2 shows other inputs 52 to the control logic 48. The signal processing in the control logic 48 determines whether there is a throttle adjust signal on line 43 or a fuel rate adjust signal on line 45 of a magnitude for an adjustment required to maintain control according to the programmed criteria.

FIG. 3 is a simplified diagram of the manner in which the control strategy of the invention works. On the vertical axis, the air to fuel ratio $\lambda$ is shown for the two magnitudes of principal interest, a first being 1.0 or stoichiometric and the second being a lean burn ratio the magnitude of which may vary between engine systems but is one that is sufficiently greater than 1.0 to yield satisfactorily low NOx emissions, as well as low fuel consumption. In some engine systems, the lean burn operating point is, for example, about 1.5. Operating at this ratio, or a higher ratio, can produce good emissions and fuel consumption.

On the horizontal axis of FIG. 3, there are identified the general factors resulting in operation at one, rather than the other, of the air to fuel ratios and the chart shows example periods of operation at each of the two ratios. Under one set of conditions identified here as (A), for a Low Speed Error and Adjust Signal Range, the ECM determines that the desired speed can be maintained while operating at the lean burn ratio. Under a second set of conditions identified as (B), for a Higher Speed Error and Adjust Signal Range, the ECM determines that meeting the desired speed requires a richer fuel ratio and moves the system to a stoichiometric ratio where good response and low NOx emissions are achieved. At a Threshold C there is a transition between the two operating points that is drawn as an abrupt transition representing the intent not to operate at an air to fuel ratio different than those at 1.0 or a chosen lean burn ratio. That is somewhat oversimplified and practical considerations, such as a desire to avoid possible dithering back and forth along the transition, would normally lead to some variations from the situation shown in FIG. 3.

Figure 4:
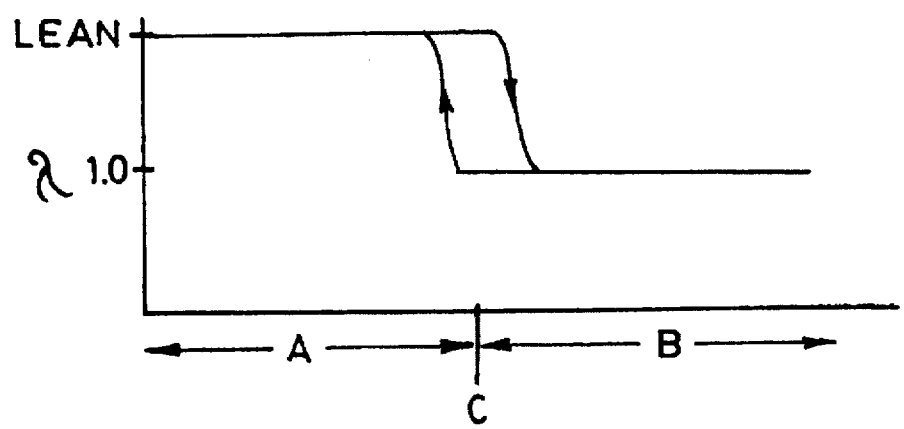

FIG. 4 shows a modification of the operation illustrated in FIG. 3. Transitions between lean and stoichiometric ratios can occur in either direction near the nominal threshold C but not right on the threshold, and with different values depending on which way the transition is going and also, with some slope to the transition. FIG. 4 illustrates a hysteresis loop resulting from the ECM's programmed operation so that whatever ratio is currently applied is maintained until some margin past the threshold is reached before a transition, with a slight slope, is made to the other air to fuel ratio. If the system is at the lean burn ratio, it will stay there until the speed error and adjust signals are somewhat greater than the nominal threshold. Conversely, if the system is at the stoichiometric ratio, it will stay there until the significant parameters are somewhat less than the nominal threshold.

It will be understood that FIGS. 3 and 4 are simplified illustrations of applications of the invention. A determination by the ECM whether to transition from one range to the other or to stay in the range where it is can be the result of fairly complex calculations involving several parameters. The control system can be programmed to operate in a map mode, generally similar to timing maps presently used in operating large engines. Also, FIGS. 3 and 4 are not intended to imply that operation will occur at the two different air to fuel ratios for about equal amounts of time. On the contrary, the engine system preferably operates at the lean burn ratio for most of the time with just brief intervals at $\lambda=1$ to respond to increased load.

INDUSTRIAL APPLICABILITY

As may be seen from the above description, the engine 10 with fuel and air delivery apparatus (16, 20, 18, 22, 24, 26 and 28) are operated by a control strategy that makes the NOx emissions low without sacrificing performance. The invention is specifically applicable to speed governed engines in which a difference between a desired speed determined by the position of a device such as an accelerator pedal and the actual motor speed is used (possibly with other parameters) to adjust the air to fuel ratio provided by the fuel and air delivery apparatus. The air to fuel ratio is controlled to operate either at a stoichiometric mix for rapid response to changing load conditions or at a lean burn mix whereby in either case there are minimal NOx emissions with use of a three-way catalyst. An engine operated, for example, with a gaseous fuel has low NOx emissions in the lean burn range, due to engine combustion characteristics, and also at a stoichiometric ratio, due to the three-way catalyst.

By operating in a lean burn mode during a substantial portion of operating time, the engine has improved fuel economy and lower heat rejection (permitting a smaller radiator for coolant water) compared to a similar engine operated only at a stoichiometric mix. Also, the ability to use a stoichiometric mix as needed results in improved response to an increased load. The engine system allows operation of the engine as a lean burn engine with improved load response by brief periods at a stoichiometric ratio, with low NOx throughout operation.

It will be recognized that the invention may be practiced in various forms in addition to those specifically shown or described herein and that numerous changes may be made by those skilled in the art without departing from the spirit and scope of the invention.

What is claimed is:

1. A speed-governed engine and a low NOx fuel system therefor comprising:

an engine having a plurality of cylinders providing a like plurality of combustion chambers;

fuel and air delivery apparatus communicating with the respective combustion chambers;

exhaust apparatus including a catalyst for minimizing NOx emissions from the engine;

an adjustable speed setting device that can be set to a desired engine speed; and a control unit for maintaining the engine at the desired engine speed regardless of load variations, said control unit being arranged to receive a plurality of signals including signals representing the desired engine speed and actual engine speed, and to apply one or more control signals to the fuel and air delivery apparatus to adjust the ratio of air to fuel and the quantity of fuel delivered by the fuel and air delivery apparatus, said control unit being operative to regulate the ratio of air to fuel either substantially at a stoichiometric ratio in which said catalyst is effective to minimize NOx emissions or at a lean burn ratio at which NOx emissions are also minimal.

2. The system of claim 1 wherein:

the fuel and air delivery apparatus comprises an injector connected with a fuel source by a fuel conduit and an air inlet; and said fuel conduit has a regulator and said air inlet has a throttle, said regulator and said throttle being controllable in accordance with signals from the control unit.

3. The system of claim 1 wherein:

the adjustable speed setting device is an operator controlled accelerator pedal of a vehicle driven by the engine.

4. The system of claim 1 wherein:

the fuel and air delivery apparatus comprises an injector connected with a fuel source containing a gaseous fuel by a fuel conduit and an air inlet; and said fuel conduit has a regulator and said air inlet has a throttle, said regulator and said throttle being controllable in accordance with signals from the control unit;

the adjustable speed setting device is an operator controlled accelerator pedal of a vehicle driven by the engine; and the stoichiometric ratio of air to fuel is produced when the engine is required to meet higher load demands at said desired engine speed whereby the engine is controllable for low NOx emissions substantially continuously during both high load and low load conditions while maintaining the desired engine speed.

5. A method of operating a speed-governed engine and fuel system therefor, in order to maintain low NOx emissions throughout operation, the engine having an exhaust conduit with a catalytic converter, comprising the steps of:

setting a desired engine speed to be maintained regardless of engine load;

monitoring operating conditions of the engine including actual engine speed;

determining whether a speed difference exists between the desired and the actual engine speeds;

adjusting fuel and air flow to the engine to operate either at a stoichiometric air to fuel ratio or at a nonstoichiometric, lean burn, ratio with low NOx emissions while substantially maintaining the desired speed, wherein the fuel system of the engine is one for supplying a gaseous fuel to the engine and the adjusting of fuel and air flow is performed with a rapid change between the stoichiometric and the lean burn ratios, and the adjusting of fuel and air flow is performed with a hysteresis such that a change from the stoichiometric ratio to the lean burn ratio occurs at different monitored engine operating conditions than a change from the lean burn ratio to the stoichiometric ratio.

6. The method of claim 5 wherein:

the setting of a desired engine speed comprises adjusting an accelerator pedal;

the monitoring of engine operating conditions comprises providing an actual speed signal to a control unit;

the determining whether a predetermined speed difference exists comprises comparing in the control unit, the actual speed signal to a signal representing the desired engine speed;

the adjusting fuel and air flow comprises providing signals from the control unit to a fuel regulator and an air throttle to achieve either the stoichiometric air to fuel ratio or the nonstoichiometric, lean burn, ratio with low NOx emissions while minimizing transitions therebetween.

7. The method of claim 5 wherein:

the adjusting of fuel and air flow is performed to have a lean burn operation over a substantial portion of total operation.

* * * * *

UNITED STATES PATENT AND TRADEMARK OFFICE
CERTIFICATE OF CORRECTION

PATENT NO. : 5,738,070

DATED : April 14, 1998

INVENTOR(S) : George E. Donaldson and William H. Lane

It is certified that error appears in the above-identified patent and that said Letters Patent is hereby corrected as shown below:

Column 4, line 8, "with know practice" should read "with known practice".

Signed and Sealed this

Twenty-eighth Day of July, 1998

Attest:

BRUCE LEHMAN

*Attesting Officer*  *Commissioner of Patents and Trademarks*